(12) United States Patent
An

(10) Patent No.: US 11,251,498 B2
(45) Date of Patent: Feb. 15, 2022

(54) SECONDARY BATTERY MODULE

(71) Applicant: LG ENERGY SOLUTION, LTD., Seoul (KR)

(72) Inventor: Ji-Myong An, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 118 days.

(21) Appl. No.: 16/611,160

(22) PCT Filed: Nov. 7, 2018

(86) PCT No.: PCT/KR2018/013486
§ 371 (c)(1),
(2) Date: Nov. 5, 2019

(87) PCT Pub. No.: WO2019/112191
PCT Pub. Date: Jun. 13, 2019

(65) Prior Publication Data
US 2020/0083503 A1 Mar. 12, 2020

(30) Foreign Application Priority Data
Dec. 7, 2017 (KR) .................. 10-2017-0167138

(51) Int. Cl.
*H01M 50/256* (2021.01)
*H01M 50/204* (2021.01)
*H01M 50/249* (2021.01)

(52) U.S. Cl.
CPC ....... *H01M 50/256* (2021.01); *H01M 50/204* (2021.01); *H01M 50/249* (2021.01); *H01M 2220/20* (2013.01)

(58) Field of Classification Search
CPC . H01M 50/204; H01M 50/209; H01M 50/256
See application file for complete search history.

(56) References Cited

U.S. PATENT DOCUMENTS

| | | | |
|---|---|---|---|
| 5,111,952 A * | 5/1992 | Stocchiero | .......... H01M 50/256 220/754 |
| 5,437,944 A | 8/1995 | Kita | |
| 5,498,488 A * | 3/1996 | Stocchiero | .......... H01M 50/112 429/72 |

(Continued)

FOREIGN PATENT DOCUMENTS

| CN | 101312254 A | 11/2008 |
|---|---|---|
| CN | 101320791 A | 12/2008 |

(Continued)

OTHER PUBLICATIONS

Extended European Search Report issued in European Patent Application No. 18 88 4910 dated Jul. 21, 2020.

(Continued)

*Primary Examiner* — Gregg Cantelmo
(74) *Attorney, Agent, or Firm* — Birch, Stewart, Kolasch & Birch, LLP

(57) ABSTRACT

Disclosed is a secondary battery module. The secondary battery module includes: a plurality of secondary battery cells; a case configured to accommodate the plurality of secondary battery cells and having at least one insert opening; and a label coupled to the case and inserted into the at least one insert opening of the case.

13 Claims, 8 Drawing Sheets

(56) References Cited

U.S. PATENT DOCUMENTS

| | | | | |
|---|---|---|---|---|
| 6,022,638 | A | * | 2/2000 | Horton ............... H01M 50/256 429/187 |
| 6,224,998 | B1 | | 5/2001 | Brouns et al. |
| 8,579,425 | B2 | | 11/2013 | Hoff |
| 2008/0199771 | A1 | * | 8/2008 | Chiu ................ H01M 50/256 429/186 |
| 2008/0292956 | A1 | | 11/2008 | Hong et al. |
| 2008/0305367 | A1 | | 12/2008 | Baek et al. |
| 2010/0035142 | A1 | | 2/2010 | Ha et al. |
| 2011/0223447 | A1 | | 9/2011 | Ignor et al. |
| 2014/0045024 | A1 | * | 2/2014 | Waters ............ H01M 10/0525 429/99 |
| 2014/0219837 | A1 | * | 8/2014 | Lee ................... H01M 50/209 417/410.1 |
| 2014/0220388 | A1 | | 8/2014 | Lee |
| 2015/0228954 | A1 | | 8/2015 | Wang et al. |
| 2015/0325818 | A1 | | 11/2015 | Suzuki |
| 2016/0181581 | A1 | | 6/2016 | Takeshita et al. |
| 2016/0197323 | A1 | * | 7/2016 | DeKeuster .......... H01M 50/50 429/82 |
| 2017/0331081 | A1 | | 11/2017 | Choi et al. |
| 2018/0175341 | A1 | | 6/2018 | Kim et al. |

FOREIGN PATENT DOCUMENTS

| | | |
|---|---|---|
| CN | 101517777 A | 8/2009 |
| CN | 102364718 A | 2/2012 |
| CN | 104835979 A | 8/2015 |
| CN | 205159387 U | 4/2016 |
| CN | 107112467 A | 8/2017 |
| JP | 57-148771 U | 9/1982 |
| JP | 58-187964 U | 12/1983 |
| JP | 4-101357 U | 9/1992 |
| JP | 6-38154 U | 5/1994 |
| JP | 10-223193 A | 8/1998 |
| JP | 10-289701 A | 10/1998 |
| JP | 2005-190903 A | 7/2005 |
| JP | 2008-171726 A | 7/2008 |
| JP | 2009-158182 A | 7/2009 |
| JP | 4696674 B2 | 6/2011 |
| JP | 2014-22129 A | 2/2014 |
| JP | 2015-211022 A | 11/2015 |
| JP | 2017-524616 A | 8/2017 |
| KR | 20-0187069 Y1 | 6/2000 |
| KR | 10-0408633 B1 | 12/2003 |
| KR | 20-2012-0008530 U | 12/2012 |
| KR | 10-2014-0002118 A | 1/2014 |
| KR | 20-0475243 Y1 | 11/2014 |
| KR | 10-1466804 B1 | 12/2014 |
| KR | 10-2017-0044070 A | 4/2017 |
| KR | 10-2017-0083311 A | 7/2017 |
| WO | WO 2014/003361 A1 | 1/2014 |

OTHER PUBLICATIONS

International Search Report for PCT/KR2018/013486 (PCT/ISA/210) dated Feb. 19, 2019.

* cited by examiner

SECONDARY BATTERY MODULE

TECHNICAL FIELD

The present application claims priority to Korean Patent Application No. 10-2017-0167138 filed on Dec. 7, 2017 in the Republic of Korea, the disclosures of which are incorporated herein by reference.

The present disclosure relates to a secondary battery module, and more particularly, to a secondary battery module that is easily exchangeable in a convenient and easy way.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes a secondary battery cell in which a positive electrode plate and a negative electrode plate, respectively coated with the positive electrode active material and the negative electrode active material, are arranged with a separator therebetween, and an outer member, that is a battery case, which seals and receives the secondary battery cell together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

Generally, the secondary battery may be classified into cylindrical, rectangular and pouch-type secondary batteries depending on the shape of the exterior in which a secondary battery cell is accommodated.

FIG. 1 is a perspective view showing a conventional secondary battery module.

When a secondary battery module 1 is used in various devices or systems, the secondary battery module 1 may have to be exchanged since its life span expires. Referring to FIG. 1, a conventional secondary battery module 1 includes a handle 4 attached to an upper side of a case 2, and a label 3 attached to a side surface of the case 2. A worker pulls the handle 4 coupled to the upper side of the case 2 to separate the secondary battery module 1 from the device or system, and then couples a new secondary battery module 1 to the device or system. Here, if the handle 4 coupled to the case 2 is fabricated to have a large size, the entire volume of the secondary battery module 1 is increased, and also the secondary battery module 1 is not easily installed due to the interference between the device or system and the handle 4. If the handle 4 is fabricated to have a small size, it is not easy for the worker to grip the handle 4, which makes it difficult to exchange the secondary battery module 1.

DISCLOSURE

Technical Problem

The present disclosure is directed to providing a secondary battery module, which may be easily exchanged by a worker.

The present disclosure is also directed to providing a secondary battery module, which may include a case whose entire volume is reduced.

The present disclosure is also directed to providing a secondary battery module, which may include a label serving as a handle so that it is not needed to fabricate a handle separately.

Technical Solution

In one aspect of the present disclosure, there is provided a secondary battery module, comprising: a plurality of secondary battery cells; a case configured to accommodate the plurality of secondary battery cells and having an insert opening; and a label coupled to the case and inserted into the insert opening of the case.

Also, the case may have a placing groove in which the label is placed.

In addition, the label may include a label body coupled to the case; and handle units respectively extending from both ends of the label body by a predetermined length to be inserted into the insert opening.

Also, the case may include a case body in which the plurality of secondary battery cells are accommodated; and insert openings formed at both ends of an upper side of the case body.

In addition, the insert opening may be formed over an upper side of the case body and a side surface of the case body.

Also, the insert opening may include: a first opening formed at the upper side of the case body; and a second opening formed at the side surface of the case body to communicate with the first opening, wherein the case body may include a dividing unit disposed between the first opening and the second opening to divide the first opening and the second opening.

Also, the first opening may be formed at a side surface of the dividing unit, and the second opening may be formed at a lower side of the dividing unit.

In addition, after being inserted into the insert opening, the handle unit may be folded to overlap with the label body.

Also, the handle unit may be inserted through the first opening, be discharged through the second opening, and be folded while being supported by the dividing unit.

In addition, the secondary battery module may further comprise a bonding member configured to couple the handle unit to the label body.

Also, the secondary battery module may further comprise a cover coupled to the case at a position where the label is located in order to protect the label.

In another aspect of the present disclosure, there is also provided a vehicle, comprising the secondary battery module described above.

Advantageous Effects

According to the embodiments of the present disclosure, since the label coupled to the case may function as a handle, a worker may simply exchange the secondary battery module while gripping the label.

In addition, since the handle is unnecessary, the entire volume of the case may be reduced.

Moreover, since the label may function as a handle, it is not needed to fabricate a handle separately, thereby allowing easy manufacturing with reduced costs.

BEST MODE

Figure 1:
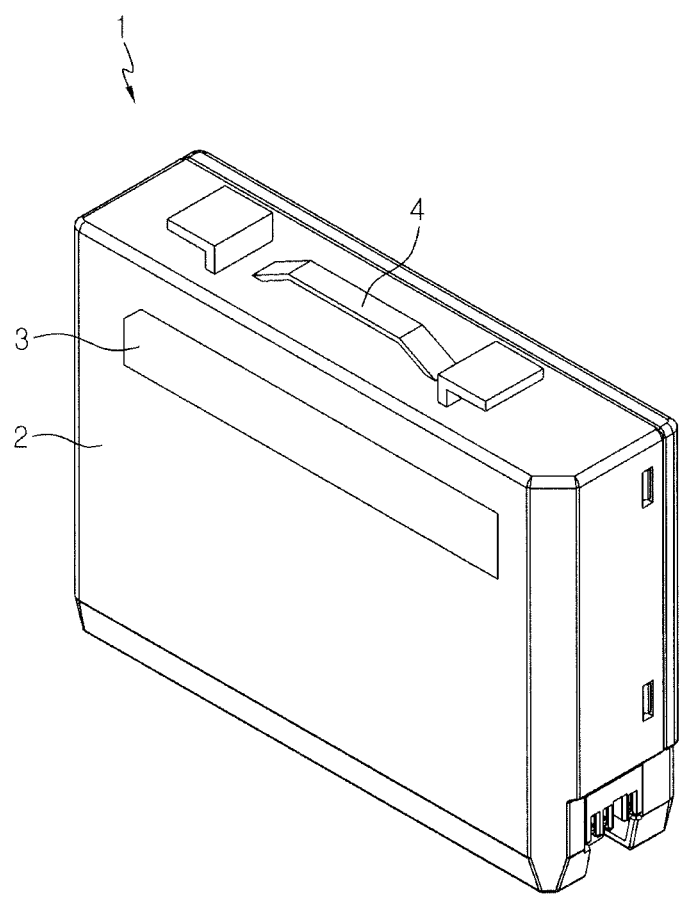
FIG. 1 is a perspective view showing a conventional secondary battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
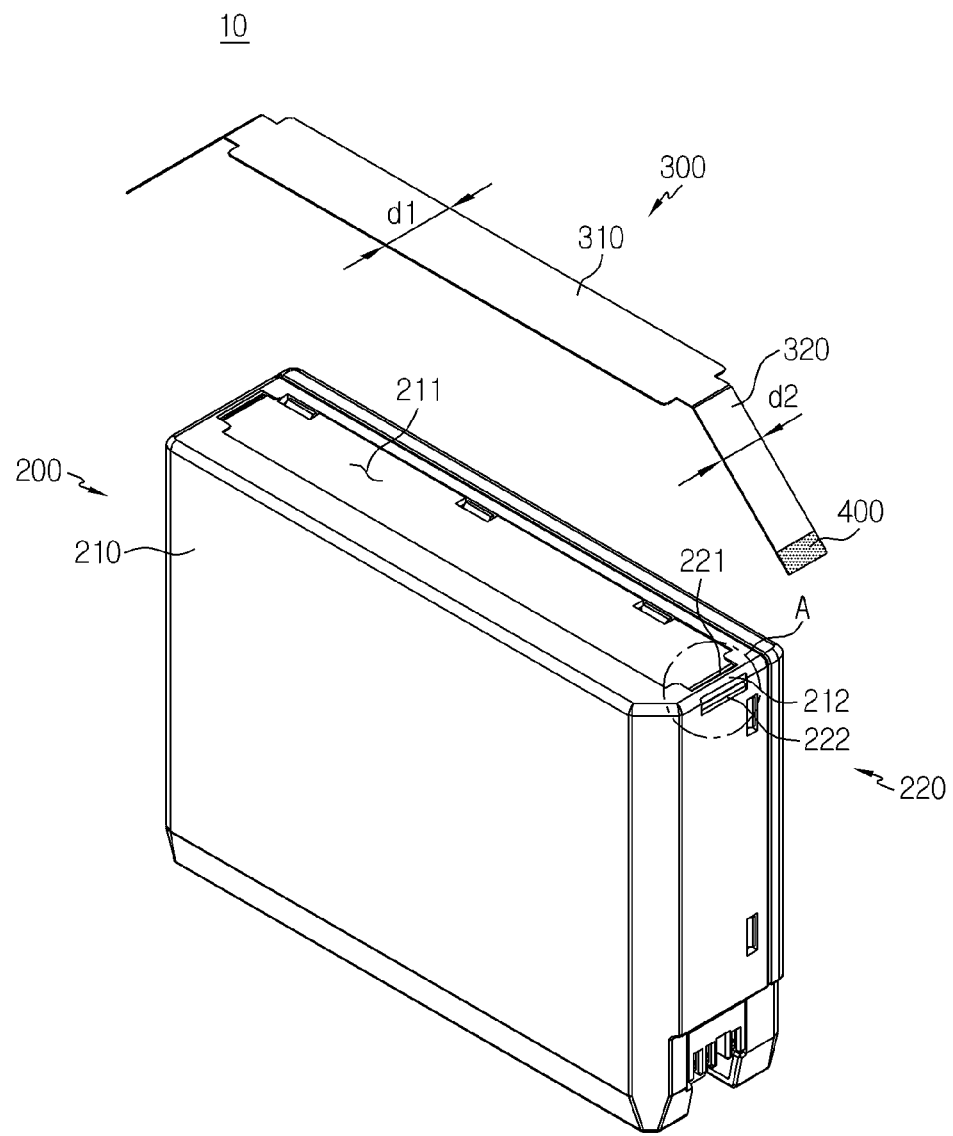
FIG. 2 is an exploded perspective view showing a case and a label of a secondary battery module according to the first embodiment of the present disclosure.
Figure 3:
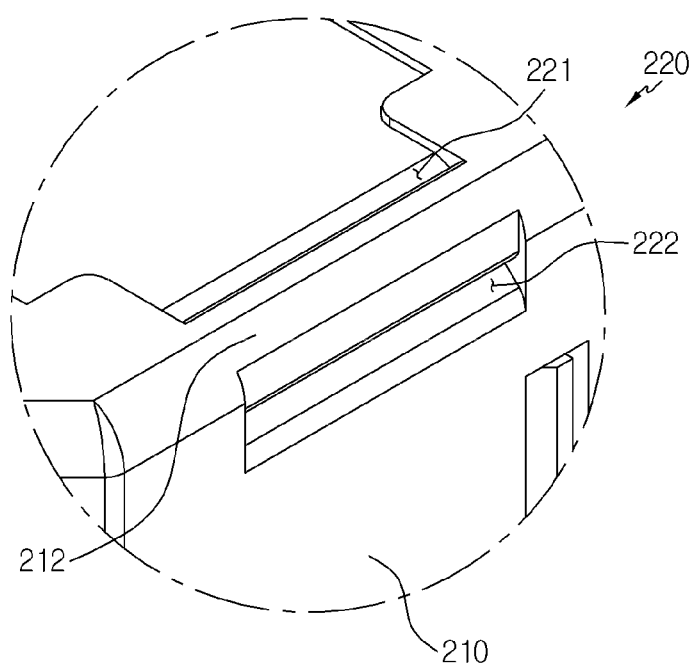
FIG. 3 is an enlarged view showing a portion A of FIG. 2.
Figure 4:
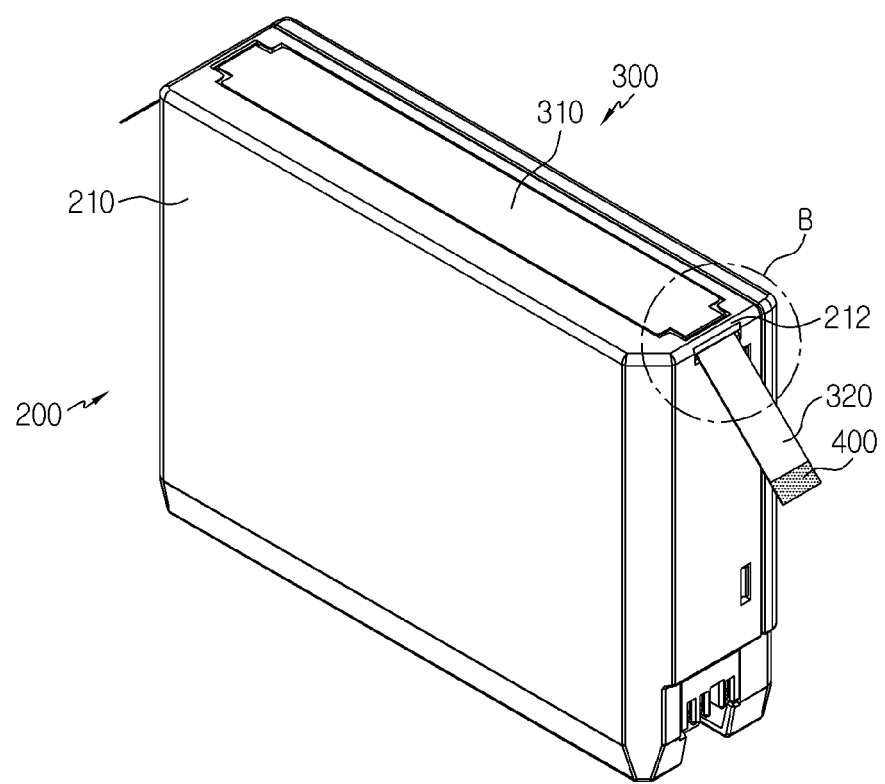
FIG. 4 is a perspective view showing the case and the label of the secondary battery module according to the first embodiment of the present disclosure, which are assembled.
Figure 5:
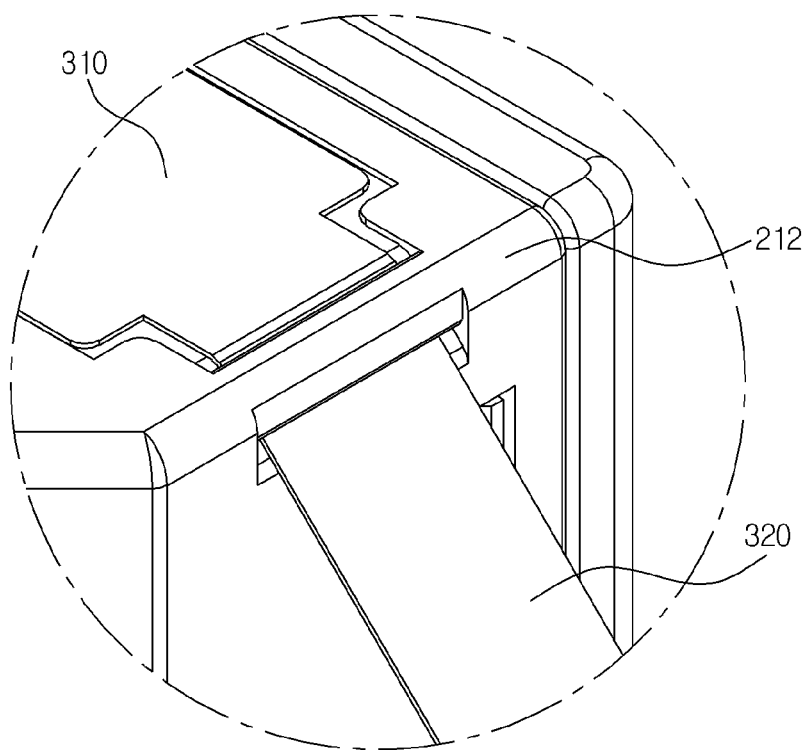
FIG. 5 is an enlarged view showing a portion B of FIG. 4.
Figure 6:
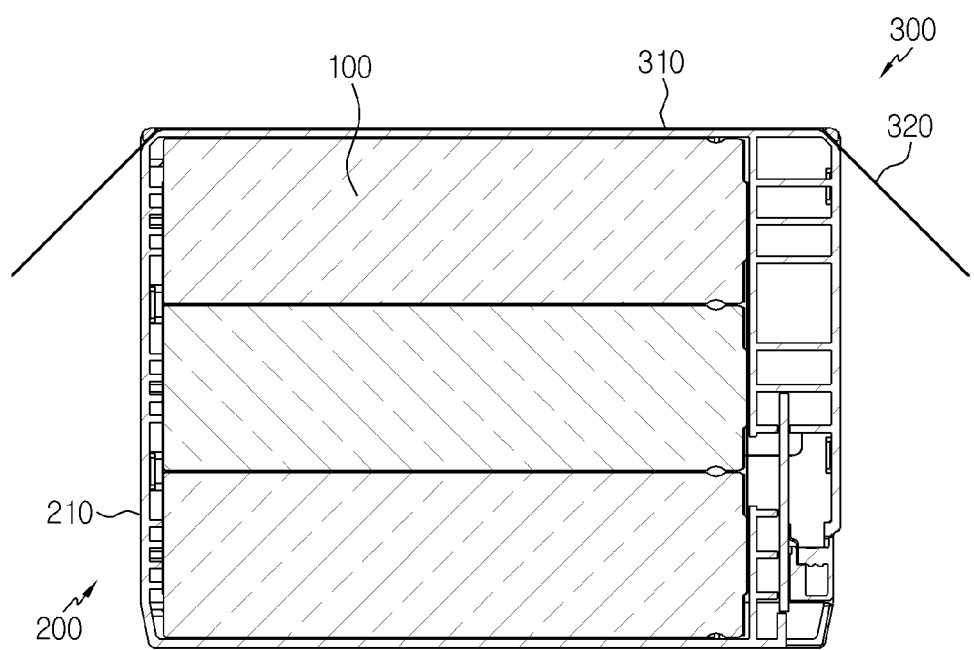
FIG. 6 is a cross-sectioned view of FIG. 4.
Figure 7:
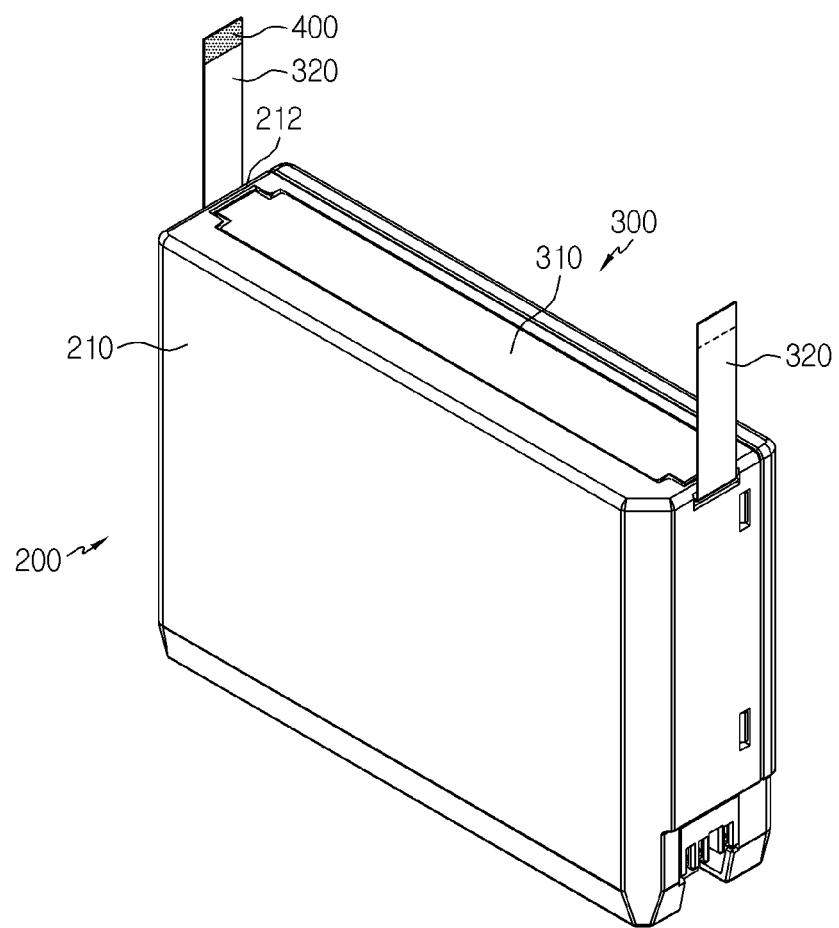
FIG. 7 is a perspective view showing that the handle unit of FIG. 4 is bent upward.
Figure 8:
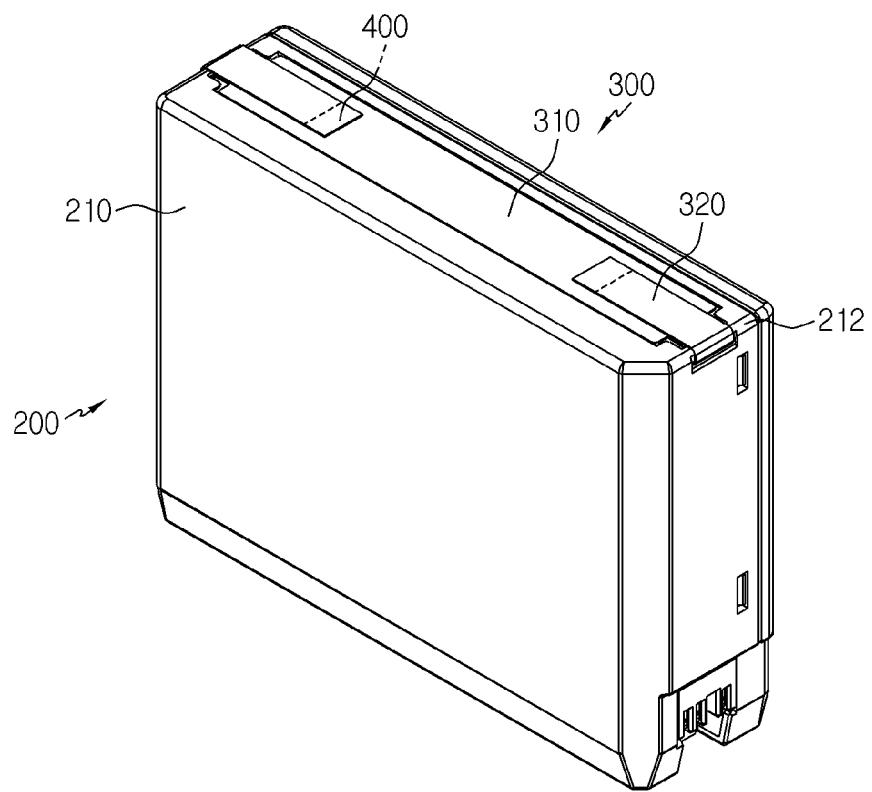
FIG. 8 is a perspective view showing that the handle unit of FIG. 7 overlaps with the label body.

FIG. 2 is an exploded perspective view showing a case and a label of a secondary battery module according to the first embodiment of the present disclosure, FIG. 3 is an enlarged view showing a portion A of FIG. 2, FIG. 4 is a perspective view showing the case and the label of the secondary battery module according to the first embodiment of the present disclosure, which are assembled, FIG. 5 is an enlarged view showing a portion B of FIG. 4, FIG. 6 is a cross-sectioned view of FIG. 4, FIG. 7 is a perspective view showing that the handle unit of FIG. 4 is bent upward, and FIG. 8 is a perspective view showing that the handle unit of FIG. 7 overlaps with the label body.

Referring to FIGS. 2 to 8, a secondary battery module 10 according to the first embodiment of the present disclosure includes a secondary battery cell 100, a case 200, and a label 300.

The secondary battery cell 100 (see FIG. 6) may be selected from various types of secondary battery cells. For example, the secondary battery cell 100 may have a cylindrical shape, a rectangular shape, or a pouch shape. Hereinafter, for convenience of explanation, the secondary battery cell 100 will be mainly described as having a cylindrical shape. Even though FIG. 6 illustrates that three cylindrical secondary battery cells 100 are accommodated in the case 200, the number of secondary battery cells 100 may be changed.

If the secondary battery cell 100 has a cylindrical shape, the secondary battery cell 100 includes an electrode assembly, for example a jelly-roll type electrode assembly, a cylindrical battery case accommodating an electrolyte solution together with the electrode assembly, a positive electrode terminal formed at, for example, an upper portion of the battery case, and a negative electrode terminal formed at, for example, a lower portion of the battery case. The electrode assembly may have a structure wound in a jelly-roll form in a state where a separator is interposed between a positive electrode and a negative electrode. A positive electrode lead (not shown) is attached to the positive electrode and connected to a positive electrode terminal at, for example, the upper portion of the battery case, and a negative electrode lead (not shown) is attached to the negative electrode terminal at, for example, a lower portion of the battery case. In addition, a cylindrical center pin (not shown) may be inserted at the center of the electrode assembly. The center pin (not shown) may fix and support the electrode assembly and serve as a passage for releasing gas generated by internal reactions during charge, discharge and operation. Meanwhile, a safety vent (not shown) may be provided in the battery case, for example, at a lower portion of a top cap (not shown), so that the safety vent is broken by a pressure rise inside the battery case to discharge the gas.

The plurality of secondary battery cells 100 are accommodated in the case 200 (see FIG. 6), and the case 200 has an insert opening 220. A label 300, explained later, may be inserted into the insert opening 220. The case 200 may include a case body 210 and an insert opening 220. Hereinafter, the case body 210 and the insert opening 220 will be described.

The plurality of secondary battery cells 100 are accommodated in the case body 210, and the case body 210 protects the secondary battery cells 100. The case body 210 may have various shapes corresponding to the shapes of various devices or systems at which the secondary battery module 10 is installed. Also, the case body 210 may be made of various materials with predetermined rigidity to protect the secondary battery cells 100. Referring to FIG. 2, the case body 210 may have a placing groove 211 in which the label 300 is placed. That is, a label body 310 of the label 300, explained later, is placed in the placing groove 211 of the case body 210, and a handle unit 320 of the label 300 may be inserted into the insert opening 220.

Referring to FIGS. 2 and 3, the insert opening 220 may be formed at both ends of an upper side of the case body 210, based on FIGS. 2 and 3. In addition, the insert opening 220 may be formed over an upper side of the case body 210 and a side surface of the case body 210. That is, the insert opening 220 includes a first opening 221 and a second opening 222, and the first opening 221 is formed at the upper side of the case body 210 and the second opening 222 is formed at the side surface of the case body 210. The first opening 221 and the second opening 222 communicate with each other. Here, a dividing unit 212 is formed at the case body 210. The dividing unit 212 is disposed between the first opening 221 and the second opening 222 to divide the first opening 221 and the second opening 222. Referring to FIGS. 2 and 3, the first opening 221 may be formed at, for example, a side surface of the dividing unit 212, and the second opening 222 may be formed at, for example, a lower side of the dividing unit 212.

One side of the label 300 is coupled to the case 200, and the other side of the label 300 extending from one side is inserted into the insert opening 220 of the case 200. The label 300 may include a label body 310 and a handle unit 320. The label body 310 may be coupled to the placing groove 211 formed at the case body 210, and various information regarding the secondary battery module 10 may be written on the label body 310. The handle unit 320 extends by a predetermined length from both ends of the label body 310 and may be inserted into the insert opening 220 through the end of the handle unit 320. Referring to FIG. 2, the label body 310 and the handle unit 320 may be integrally fabricated, and the width d1 of the label body 310 may be larger than the width d2 of the handle unit 320.

Seeing the label 300 shown in FIGS. 4 and 5, an end of the handle unit 320 may be firstly inserted through the first opening 221 formed at the upper side of the case body 210 and then discharged through the second opening 222 formed at the side surface of the case body 210 and communicated with the first opening 221. In addition, referring to FIG. 7, the handle unit 320 discharged through the second opening 222 communicating with the first opening 221 is lifted upward based on FIG. 7 while being supported by the dividing unit 212. In addition, referring to FIG. 8, the handle unit 320 is folded toward the label body 310 while being supported by the dividing unit 212 to overlap with the label body 310. Meanwhile, a bonding member 400 may be coupled to the handle unit 320, and the handle unit 320 may be coupled to the label body 310 by the bonding member 400. That is, the bonding member 400 such as a double-sided tape is coupled to an end portion of the handle unit 320. In this state, if the handle unit 320 is folded to overlap with the label body 310, the double-sided tape attaches the handle unit 320 to the label body 310. By doing so, the handle unit 320 may be detachably fixed to the label body 310. That is, the handle unit 320 may be separated from the label body 310 by removing the double-sided tape or by applying a force over a predetermined level.

Hereinafter, the operation and effect of the secondary battery module 10 according to the first embodiment of the present disclosure will be described with reference to the drawings.

As in FIG. 8, the handle unit 320 of the label 300 provided at the secondary battery module 10 is folded while being supported by the dividing unit 212 to be attached to the label body 310 by the bonding member 400 in a state of overlapping with the label body 310. The secondary battery module 10 according to the first embodiment of the present disclosure may be mounted to various devices or systems in the state of FIG. 8. For example, the secondary battery module 10 of this embodiment may be mounted to an audio video navigation (AVN) system provided at a vehicle. In addition, if the life span of the secondary battery module 10 expires, the handle unit 320 is separated from the label body 310 by removing the bonding member 400 such as a double-sided tape adhered to the label body 310 to come to a state depicted in FIG. 7. In this state, if a worker grips and pulls two handle units 320 depicted in FIG. 7, the secondary battery module 10 may be separated from various devices or systems. Then, a new secondary battery module 10 may be mounted to the device or system, thereby exchanging the secondary battery module 10. In other words, in the secondary battery module 10 according to the first embodiment of the present disclosure, since various information about the secondary battery module 10 is described on the label body 310 of the label 300, the label 300 may perform the function and role of a label. In addition, since the secondary battery module 10 may be separated from the device or system by the handle unit 320 of the label 300, a worker may easily exchange the secondary battery module 10.

Figure 9:
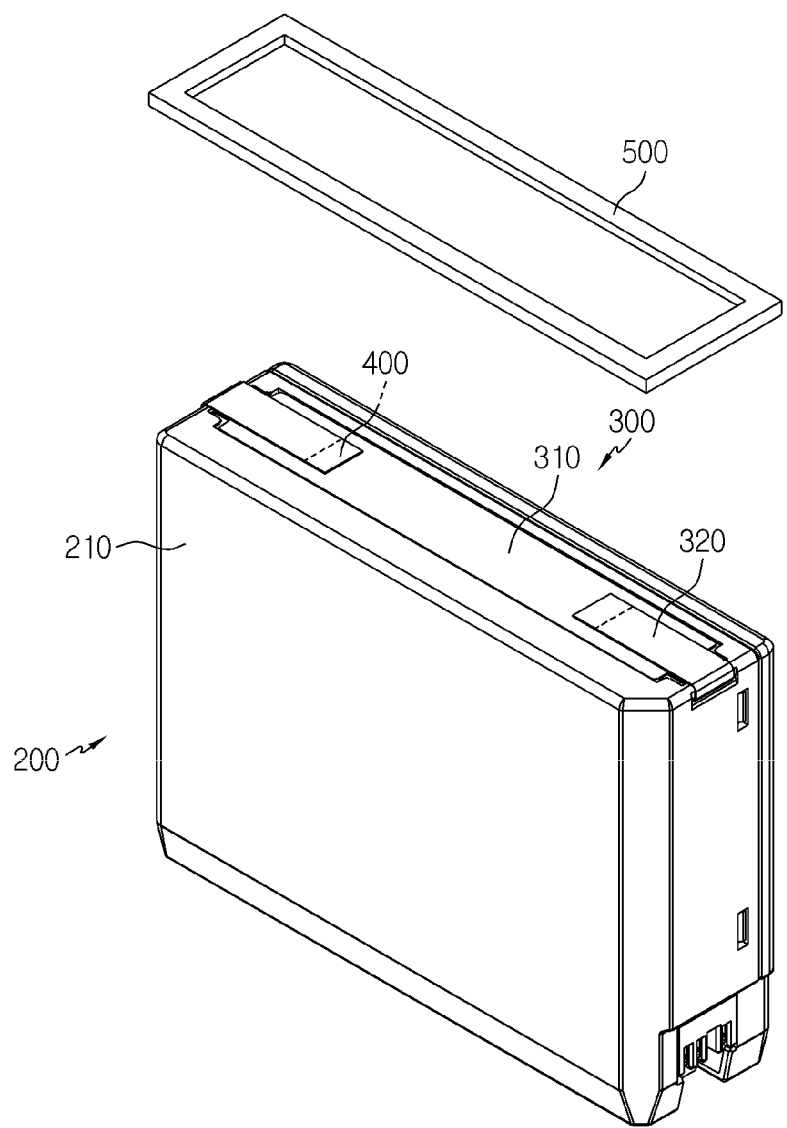
FIG. 9 is an exploded perspective view showing a case and a cover of a secondary battery module according to the second embodiment of the present disclosure.

FIG. 9 is an exploded perspective view showing a case and a cover of a secondary battery module according to the second embodiment of the present disclosure.

Hereinafter, the operation and effect of the secondary battery module 10 according to the second embodiment of the present disclosure will be described with reference to FIG. 9, and the features identical to those of the secondary battery module 10 according to the first embodiment of the present disclosure will not be described again in detail.

In the second embodiment of the present disclosure, a cover 500 is coupled to the case 200, different from the first embodiment.

Referring to FIG. 9, the cover 500 may be coupled to the case 200 at a position where the label 300 is located in order to protect the label 300. Here, the cover 500 is detachably coupled to the case 200. If the secondary battery module 10 is coupled to various devices or systems, since the cover 500 covers the label 300, the label 300 is protected from an external impact. In addition, if it is required to exchange the secondary battery module 10, the secondary battery module 10 may be separated from various devices or systems by using the handle unit 320 of the label 300 as described in the first embodiment, after the cover 500 is removed in advance.

Meanwhile, a vehicle (not shown) according to an embodiment of the present disclosure may include the secondary battery module 10 described above. In addition, the secondary battery module 10 according to each embodiment of the present disclosure may be applied to not only a vehicle using an engine but also a predetermined vehicle (not shown) using electricity like an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is directed to a secondary battery module and is particularly applicable to industries associated with a secondary battery.

What is claimed is:
1. A secondary battery module, comprising:
a plurality of secondary battery cells;

a case configured to accommodate the plurality of secondary battery cells and having at least one insert opening; and
a label coupled to the case and inserted into the at least one insert opening of the case,
wherein the label includes:
a label body coupled to the case; and
handle units respectively extending from opposite ends of the label body by a predetermined length to be inserted into the at least one insert opening,
wherein the case includes:
a case body in which the plurality of secondary battery cells are accommodated; and
the at least one insert opening includes a plurality of insert openings formed respectively at opposite ends of an upper side of the case body, and
wherein an insert opening of the plurality of insert openings is formed over an upper side of the case body and a side surface of the case body.

2. The secondary battery module according to claim 1, wherein the case has a placing groove in which the label is placed.

3. The secondary battery module according to claim 1, wherein the insert opening of the plurality of insert openings includes:
a first opening formed at the upper side of the case body; and
a second opening formed at the side surface of the case body to communicate with the first opening, and
wherein the case body includes a dividing unit disposed between the first opening and the second opening to divide the first opening and the second opening.

4. The secondary battery module according to claim 3, wherein the first opening is formed at a side surface of the dividing unit, and the second opening is formed at a lower side of the dividing unit.

5. The secondary battery module according to claim 3, wherein each handle unit is inserted into the insert opening of the plurality of insert openings, and is folded to overlap with the label body.

6. The secondary battery module according to claim 5, wherein each handle unit is inserted through the first opening, is discharged through the second opening, and is folded while being supported by the dividing unit.

7. The secondary battery module according to claim 5, further comprising:
a bonding member configured to couple each handle unit to the label body.

8. The secondary battery module according to claim 5, further comprising:
a cover coupled to the case at a position where the label is located in order to protect the label.

9. A vehicle, comprising a secondary battery module according to claim 1.

10. A secondary battery module, comprising:
a plurality of secondary battery cells;
a case configured to accommodate the plurality of secondary battery cells and having a plurality of insert openings;
a label coupled to the case and inserted into the plurality of insert openings of the case; and
a cover coupled to the case at a position where the label is located in order to protect the label,
wherein the case has a placing groove in which the label is placed, and
wherein the plurality of insert openings includes:
a first opening formed at an upper side of the case body; and
a second opening formed at a side surface of the case body to communicate with the first opening.

11. The second battery module according to claim 10, wherein the case body includes a dividing unit disposed between the first opening and the second opening to divide the first opening and the second opening.

12. The second battery module according to claim 10, wherein the first opening is formed within the placing groove.

13. A secondary battery module, comprising:
a plurality of secondary battery cells;
a case configured to accommodate the plurality of secondary battery cells and having a placing groove and insert openings,
wherein each insert opening includes a first opening formed in the placing groove at an upper side of the case body and a second opening formed at a side surface of the case body to communicate with the first opening; and
a label having a label body and handle units, the label body being placed in the placing groove, and the handle units respectively extending from opposite ends of the label body by a predetermined length to be respectively inserted into the insert openings,
wherein each handle unit is inserted into a respective insert opening of the insert openings, and is folded to overlap with the label body.

* * * * *